US010000316B2

(12) United States Patent
Geiger et al.

(10) Patent No.: US 10,000,316 B2
(45) Date of Patent: Jun. 19, 2018

(54) ONE-WAY VALVE FOR A COMPRESSIBLE CONTAINER AND CONTAINER WITH SUCH A VALVE

(71) Applicant: HOFFMANN NEOPAC AG, Thun (CH)

(72) Inventors: Andreas Geiger, Heimberg (CH); Jan Wuthrich, Port (CH)

(73) Assignee: HOFFMAN NEOPAC AG, Thun (CH)

(*) Notice: Subject to any disclaimer, the term of this patent is extended or adjusted under 35 U.S.C. 154(b) by 0 days. days.

(21) Appl. No.: 15/122,829

(22) PCT Filed: Mar. 19, 2014

(86) PCT No.: PCT/CH2014/000033
§ 371 (c)(1),
(2) Date: Aug. 31, 2016

(87) PCT Pub. No.: WO2015/139147
PCT Pub. Date: Sep. 24, 2015

(65) Prior Publication Data
US 2017/0066563 A1 Mar. 9, 2017

(51) Int. Cl.
B65D 35/46 (2006.01)
B65D 47/20 (2006.01)
(Continued)

(52) U.S. Cl.
CPC ............. B65D 35/46 (2013.01); B65D 35/02 (2013.01); B65D 47/2031 (2013.01); F16K 15/16 (2013.01)

(58) Field of Classification Search
CPC .... B65D 35/02; B65D 35/46; B65D 47/2031; F16K 15/16; B05B 11/0072; B05B 11/047
See application file for complete search history.

(56) References Cited

U.S. PATENT DOCUMENTS 2,667,992 A 2/1954 Hammond et al.
4,349,134 A 9/1982 Schuster et al.
(Continued)

FOREIGN PATENT DOCUMENTS

EP 0554181 A1 8/1993
EP 2546523 A2 1/2013
(Continued)

OTHER PUBLICATIONS

International Search Report for PCT Serial No. PCT/CH2014/000033 dated Nov. 28, 2014.

Primary Examiner — J. Casimer Jacyna
(74) Attorney, Agent, or Firm — McCormick, Paulding & Huber LLP

(57) ABSTRACT

A collapsible container is provided with a one-way valve. The valve comprises a cupola shaped slitted membrane forming a closure head to allow dispensing a liquid contained in the container by opening the membrane under liquid pressure. When pressure is reduced the membrane will close and prevent the entrance of air into the container. To avoid a deformation of the membrane in counter dispensing direction a supporting column is arranged within the valve ending in a distance from the lower side of the membrane. This column will prevent an opening of the membrane closure head towards the container storage room when air pressure in direction into the container is too high to be borne by the membrane closure head alone.

14 Claims, 5 Drawing Sheets

(51) Int. Cl.
*B65D 35/02* (2006.01)
*F16K 15/16* (2006.01)

(56) References Cited

U.S. PATENT DOCUMENTS

| | | | | |
|---|---|---|---|---|
| 5,788,108 A * | 8/1998 | Rohr | ................. | B65D 47/08 215/238 |
| 5,927,567 A * | 7/1999 | Fillmore | ................. | B29C 43/146 222/490 |
| 6,050,451 A * | 4/2000 | Hess | ................. | B65D 5/746 105/107 |
| 6,145,707 A * | 11/2000 | Baudin | ................. | B05B 11/0021 222/189.09 |
| 6,749,092 B2 * | 6/2004 | Olechowski | ................. | B65D 47/10 222/490 |
| 2004/0200738 A1 * | 10/2004 | Rovelli | ................. | B65D 47/2031 206/217 |
| 2006/0138163 A1 * | 6/2006 | Danks | ................. | B65D 47/2031 222/1 |
| 2006/0249536 A1 * | 11/2006 | Hartman | ................. | B67D 1/0004 222/129.3 |
| 2007/0029353 A1 * | 2/2007 | Haechl | ................. | B65D 41/045 222/556 |
| 2007/0062906 A1 * | 3/2007 | Morano | ................. | B65D 47/06 215/311 |
| 2007/0295765 A1 * | 12/2007 | Bull | ................. | B65D 47/2031 222/494 |
| 2009/0212078 A1 * | 8/2009 | Gaus | ................. | B65D 47/2031 222/490 |
| 2014/0263443 A1 * | 9/2014 | Furusawa | ................. | B65D 83/0055 222/105 |
| 2015/0260179 A1 * | 9/2015 | Hatton | ................. | B05B 11/0043 417/395 |

FOREIGN PATENT DOCUMENTS

| | | |
|---|---|---|
| JP | H11189251 A | 7/1999 |
| WO | 2013065599 A1 | 5/2013 |

\* cited by examiner

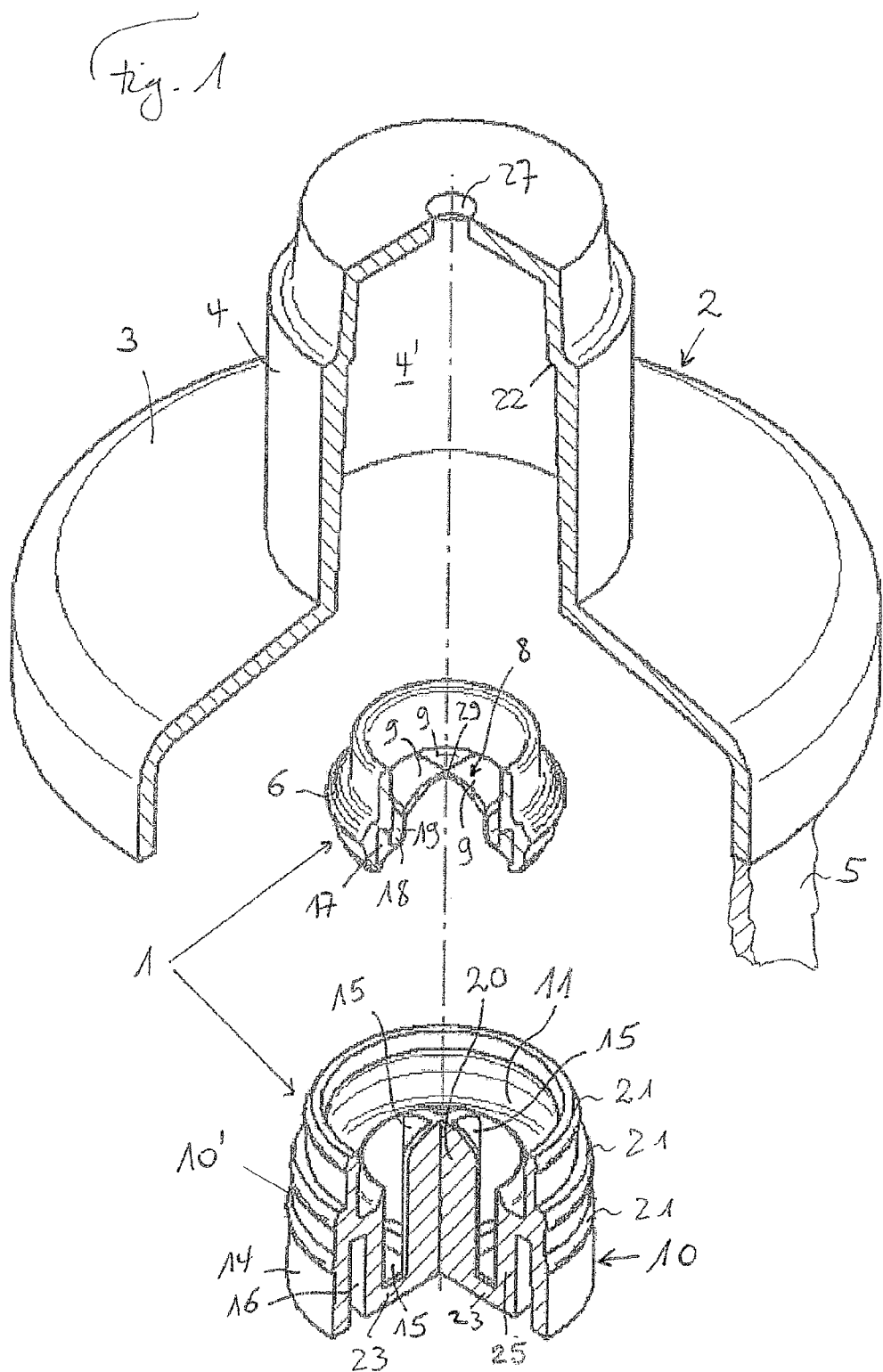

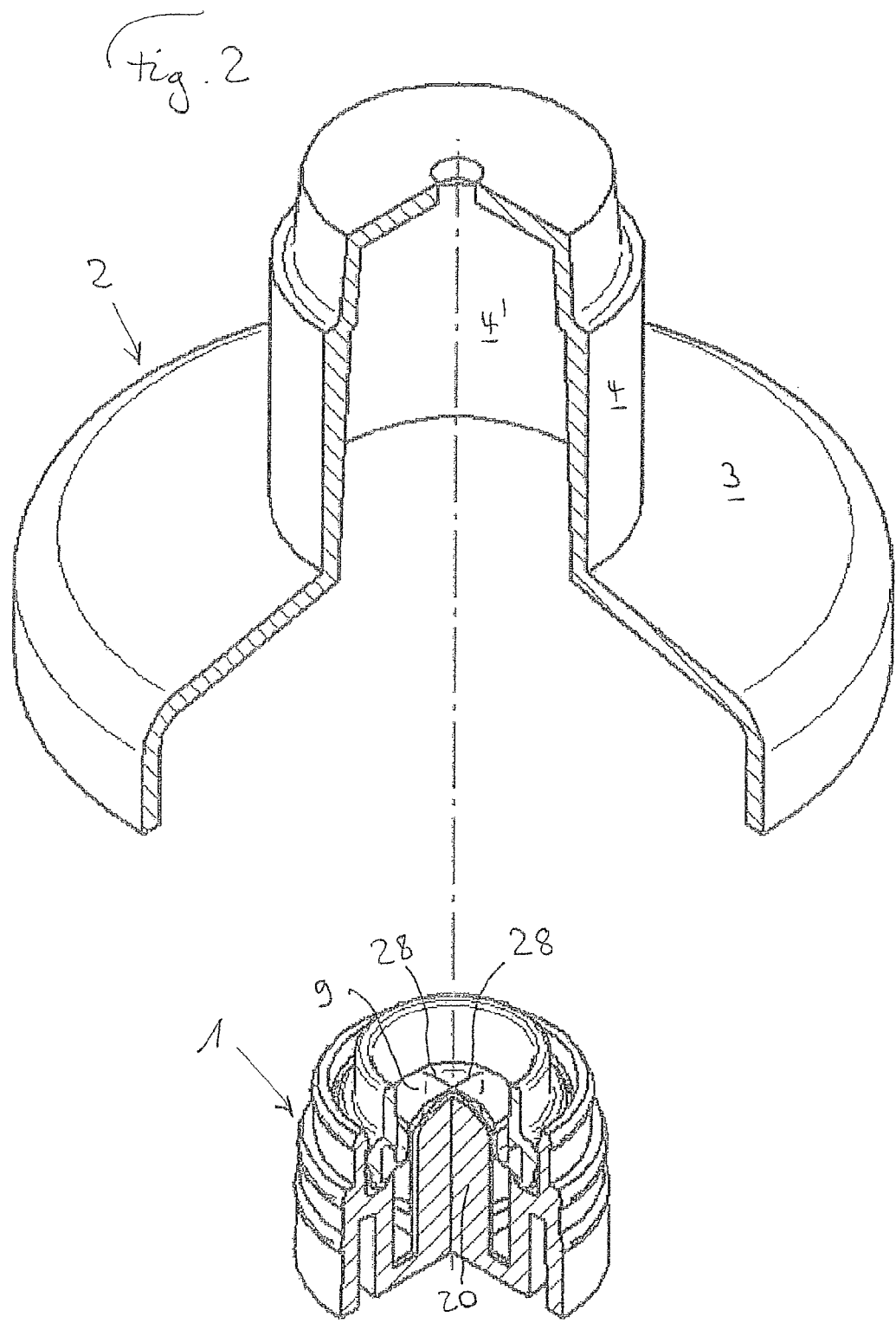

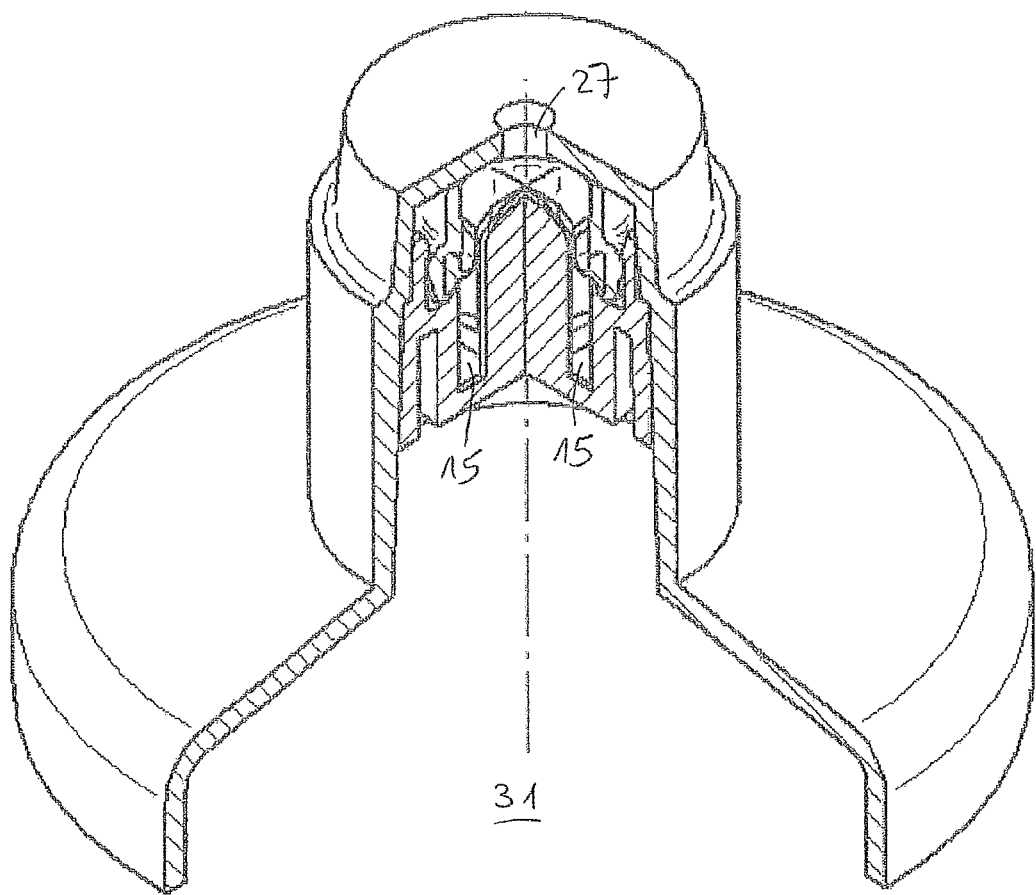

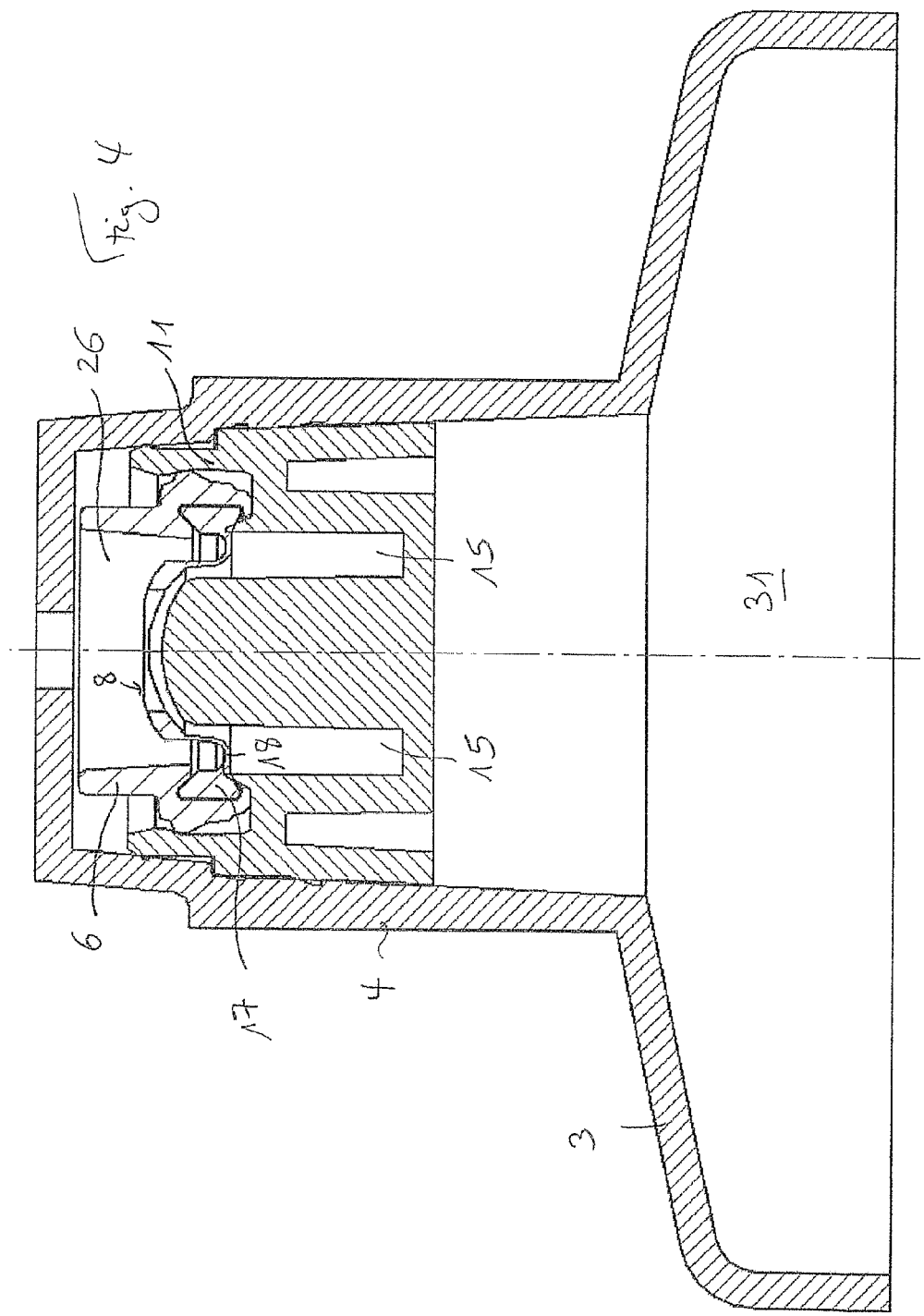

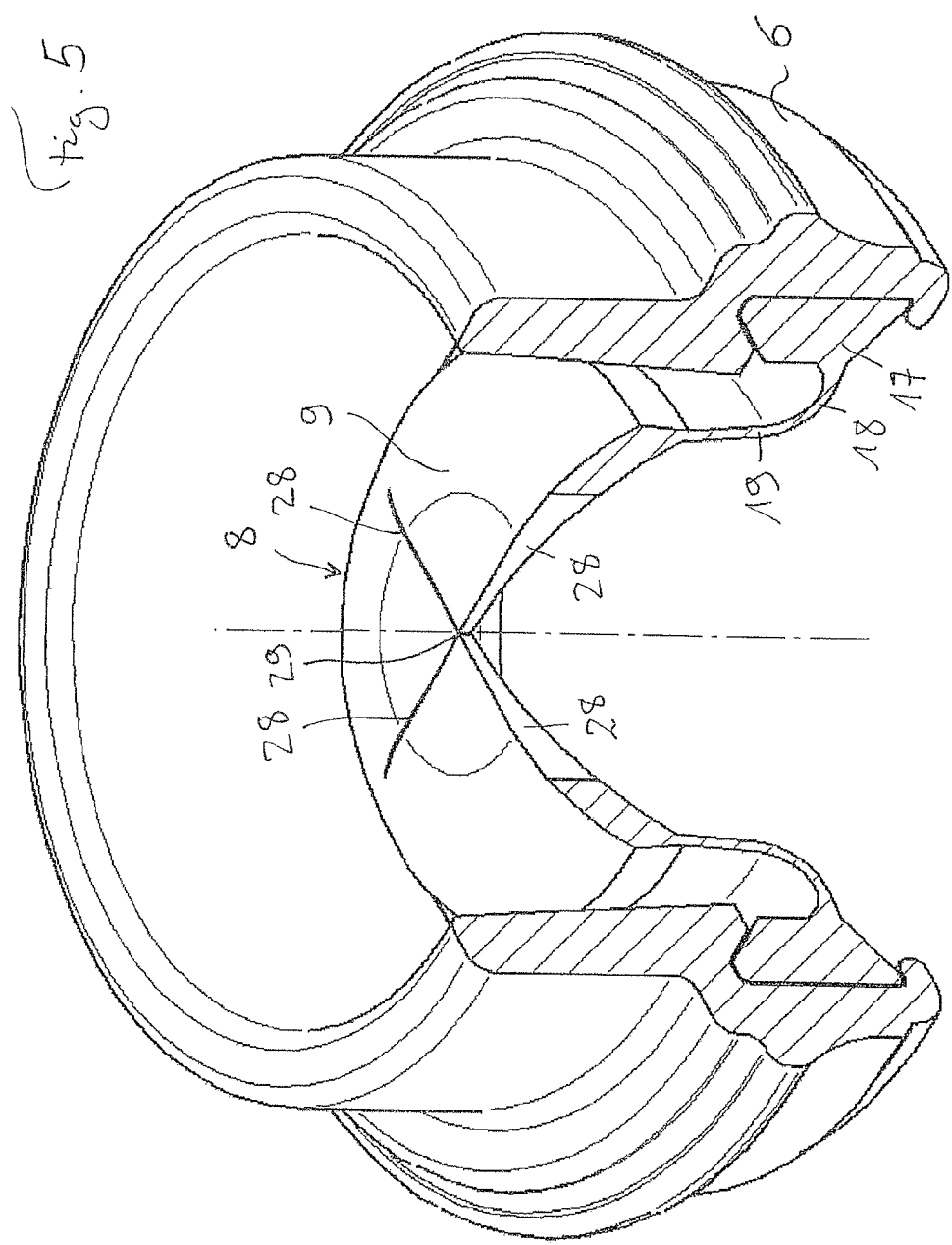

ONE-WAY VALVE FOR A COMPRESSIBLE CONTAINER AND CONTAINER WITH SUCH A VALVE

CROSS-REFERENCE TO RELATED APPLICATION

This application is entitled to the benefit of and incorporates by reference subject matter disclosed in International Patent Application No. PCT/CH2014/000033 filed on Mar. 19, 2014.

TECHNICAL FIELD

The invention relates to a one-way valve adapted for controlling liquid flow out of a collapsible container upon compression of said container and for blocking the entrance of air into said container when dispensing pressure is relieved. The invention relates further to a compressible container and in particular a tube with such a one-way valve.

BACKGROUND OF THE INVENTION

One-way valves for dispensing fluids from compressible containers, such as tubes, are known. For example WO2011/127610 A1 describes a one-way valve for a tube. The construction of this valve with a flat disc-shaped valve member and a particularly dimensioned head space above the flat disc results in a rather strict limitation of the flow of the product to be dispensed, which is a desired effect of this valve, but may not be advantageous for other containers for which a less restricted flow may be desirable. An essential effect of a one-way valve is to avoid the sucking in of air into the container or tube, respectively, when compression of the container is released and dispensing is stopped. Thus the one-way valve will minimize reactions of air and in particular oxygen with the contents of the container. Further, when air is not allowed to enter the container by the one-way valve it is avoided that the container regains its original shape and thus the increasing deformation of the container gives an indication of the contents remaining in the container. EP 850 177 B1 shows a self-closing closure with a closure membrane having a concave shaped, slitted closure head, which bursts open upon pressure on the container and which is designed to allow air to enter the container after dispensing and which is thus not a one-way valve for preventing the entrance of air into the container. Thus, known one-way valves do permit only low flow rates—which can be very well suited for small tubes in particular in the pharmaceutical field or such closures—if suited for larger amounts of liquid to be dispensed—do not prevent the entrance of air into the container.

SUMMARY OF THE INVENTION

Hence, it is a general object of the invention to provide a one-way valve that provides for large amounts of liquid flow and is thus suitable for large containers or large tubes, respectively, such as in use for cosmetics but as well for pharmaceuticals. On the other hand the one-way valve shall have good closing properties preventing the entrance of air into the container or tube, respectively.

Now, in order to implement these and still further objects of the invention, which will become more readily apparent as the description proceeds, a one-way valve adapted for controlling liquid flow is manifested by the features that it comprises an annular closure membrane holder, a closure membrane mounted within said closure membrane holder and extending therein in a generally convex shape as seen in dispensing liquid flow direction and having a closure head with several closure tongues being arranged to contact each other and to form a closed cupola shaped head at rest and to elastically deform and to partly separate from each other to provide a dispensing opening under liquid pressure, and further comprising an adapter having an upper annular part adapted for taking up and securing said closure membrane holder and having a lower part including a column extending into the upper annular part and towards the closure head, said adapter providing at least one flow channel extending from its lower part to its upper part and said adapter being shaped on its outside to be adapted to sealingly fit the inside of the container.

The membrane closure head of the one-way valve allows on the one hand a large and very smooth liquid flow so that dosing and dispensing of considerable amounts of liquid become possible. On the other hand the membrane will be supported by the column when air pressure is from the outside of the container is becoming too large to be supported by the membrane alone. This makes the one-way valve according to the invention suitable even for rather large containers.

In a preferred embodiment the adapter is provided with an annular shaped lower outer wall structure, an annular shaped lower inner wall structure and an annular recess separating the outer and inner wall structures, which will allow for a tight fitting of the valve within a container neck since the recess will allow that the outer wall structure adapts well to the inside of a container neck.

In a further preferred embodiment at least a part of the flow channel is arranged in the column which is for example provided with vertical grooves. This results in a compact arrangement allowing a good amount of flow directed straight at the membrane closure head. There may be at least two flow channels and in particular four flow channels in said column.

It is preferred that the column does not touch the membrane closure head at its closed rest position. To this end it is preferred that the distance between the top of the column and the inside of the closure head at the rest position is about 0.5 to 3 times the thickness of the closure head. Since the closure head thickness may not be equal over the area of the closure head the mean thickness of the closure head will be considered for this range.

The invention relates further to a collapsible container such as a tube or bottle. It is an object of the invention to provide such containers with good dispensing properties even for large amounts of liquid and with high sealing quality against the entrance of air into the container after dispensing in order to protect the contents of the container and to ensure that the container keeps its more and more collapsed form during the time in which the contents are used.

This goal is met by a collapsible container provided with a one-way valve and wherein the one-way valve of the container comprises or consists of an annular closure membrane holder, a closure membrane mounted within said closure membrane holder and extending therein in a generally convex shape as seen in dispensing liquid flow direction and having a closure head with several closure tongues being arranged to contact each other and to form a closed cupola shaped head at rest and to elastically deform and to partly separate from each other to provide a dispensing opening under liquid pressure, and further comprising an adapter having an upper annular part adapted for taking up and securing said closure membrane holder and having a lower part including a column extending into the upper annular part and towards the closure head, said adapter providing at least one flow channel extending from its lower part to its upper part and said adapter being sealingly fitted to the inside of the container.

The collapsible container allows on the one hand a large and very smooth liquid flow so that dosing and dispensing of considerable amounts of liquid become possible. On the other hand the membrane will be supported by the column when air pressure is from the outside of the container is becoming too large to be supported by the membrane alone.

In a preferred embodiment of the collapsible container the adapter comprises an annular shaped lower outer wall structure, an annular shaped lower inner wall structure and an annular recess separating the outer and inner wall structures, which provides for a tight fit of the valve within the container. A compact construction and a large flow become possible if the column forms part of the at least one flow channel. In particular four flow channels are provided giving a good flow characteristic. It is preferred that the distance between the top of the column and the inside of the closure head in the range of is 0.5 to 3 times the thickness of the closure head and here the mean thickness of the closure head can be taken when the closure head thickness is varying over the closure head diameter.

Preferably the container is a tube with a body part, a head part with a neck and a shoulder and the one-way valve is fitted by a press-fit within the neck.

Thus in general a collapsible container and a one-way valve is provided with the present invention. The valve comprises a cupola shaped slitted membrane forming a closure head to allow dispensing of a liquid contained in the container by opening the membrane under liquid pressure. When pressure is reduced the membrane will close and prevent the entrance of air into the container. To avoid a deformation of the membrane in counter dispensing direction a supporting column is arranged within the valve ending in a distance from the lower side of the membrane. This column will prevent an opening of the membrane closure head towards the container storage room when air pressure in direction into the container is too high to be borne by the membrane closure head alone.

BRIEF DESCRIPTION OF THE DRAWINGS

The invention will be better understood and objects other than those set forth above will become apparent when consideration is given to the following detailed description thereof. This description makes reference to the annexed drawings, wherein:

FIG. 1 shows a partially sectional perspective view of a container head and separated parts of a one-way valve shown outside of the container head;

FIG. 2 shows the view of FIG. 1 wherein the two parts of the one-way valve are united to form the functional one-way valve which is still shown outside of the container head;

FIG. 3 shows a view according to FIGS. 1 and 2 but with the one-way valve mounted and in its final position within the container head;

FIG. 4 shows a vertical sectional view of the container according to FIG. 3; and FIG. 5 shows a partial sectional perspective view of the membrane holder and the membrane alone.

DETAILED DESCRIPTION OF THE DRAWINGS

A preferred embodiment of the invention will now be described in detail. A one-way valve is shown in the drawings and a container containing a substance to be dispensed is partly shown. Such a container can be a collapsible bottle or can be a tube. The substance can be any liquid of a low to medium viscosity that is suitable to be dispensed from a collapsible container, and can for example be a product with a viscosity similar to water or with a viscosity of an oil or of a low-viscosity cream. The product can for example be a cosmetic product or a pharmaceutical product. The container is shown having a flat top with a round opening for the liquid to be dispensed. The container may as well be equipped with a dispensing cannula or other means for dispensing the product that has passed the one-way valve arranged in the container. The terms up/upwards and down/downwards are used with regard to the upright container or the one-way valve shown in the drawings and up/upwards shall denote a direction or position that lies the direction of the liquid flow when the container is pressed or in other words in the direction in which the one-way valve opens, respectively. Accordingly, down/downwards means the opposite direction in which the one-way valve closes or the direction into the liquid storage area of the container, respectively. The terms horizontal and vertical are as well used with regard to the valve and container as shown in the drawing. The Figures show the rest position of the opening/closing membrane. This membrane is deformed into an opening position as will be explained below. The shown rest position is a closing position. Air pressure from outside after dispensing will be borne by the membrane in this rest position or the membrane may bend towards the column as will be explained. In the rest position shown or when bent towards the column, the membrane will seal tight and will prevent the entering of air into the storage room of the container.

The container of the example of the drawings is only shown by the container head 2, being the head of a collapsible bottle or of a tube, and by only a small part of the body 5 which is shown in FIG. 1 only. The container head 2 has a shoulder 3 connecting a neck 4 of the container with the body 5. In this example the neck 4 is cylindrical and in particular has a cylindrical inner wall 4' to which the one-way valve is sealingly connected, so that the valve fits into the neck and the liquid has to pass through the one-way valve and will not pass between the inner wall 4' and the one-way valve. The sealing fit of the one-way valve within the neck is provided by a tight form fit of valve and neck as shown in the Figures. Other ways of sealing by using a glue or plastic welding may be used. Sealing ribs 21 may be arranged on the outside of the valve as shown. An inside rim 22 within the neck limits the upward movement of the valve, when the one-way valve is mounted into the neck by a movement in upward direction in the drawing but this rim will also improve sealing. Of course, the actual movement to introduce the one-way valve into the neck by the still open back of the container or tube, respectively, on a production line may as well be downward, if the container is held head down in the production line during this step, but for the sake of this description the term upward refers to the container as shown in the present drawings.

The one-way valve 1 comprises—and in particular only consists of—three parts. One the one hand there is a membrane holder 6 of annular shape. A membrane 7 is fitted by its annular edge 17 to this holder and is thus fixed within this holder 6. The membrane holder is made of a hard plastic material such as polypropylene or polyethylene. Membrane 7 on the other hand is made by a comparably soft elastomer, for example from a silicone material. The rim or edge 17 of this membrane extends outside of the connection with the holder 6 into a short essentially horizontal section 18 and then the membrane extends upwards by an essentially vertical section 19 and then forms a closure head 8, which is slightly convex in upward direction and thus exhibits the shape of a cupola. This closure head 8 is slitted, the slits 28 meeting in the center 29 of the head, so that several tongues 9 are provided. In the rest state of the membrane closure head 8 as shown in the drawings, these tongues 9 abut with their slit edges to each other and this contact provides a seal that defines the closed state of the one-way valve. Due to the upward convex cupola shape air pressure acting in downward direction on the closure head 8 and thus on the tongues 9 tends to press the tongues tighter together and thus to close the slits even better. In this closed state the passage of air from the outside of the container into the storage room 31 of the container is blocked by the valve.

The one-way valve further comprises or consists of a third part other than the membrane 7 and the membrane holder 6. This third part is an adapter 10. The adapter is made of a plastic material such as polypropylene and provided with an outside shape that allows for a form fit of the outside 10' of the adapter to the inside wall 4' of the container neck 4. The outside 10' of the adapter 10 will be provided with the sealing ribs 21 as mentioned above, when such ribs are present. An annular space 16 may be provided which separates an outer section 14 of the adapter wall from an inside structure 25 of the adapter for allowing elastically deformation of the adapter 10 when the adapter is press fitted into the neck of the container.

On its upper side the adapter 10 is provided with an annular holding section 11 which is shaped at its inside to receive membrane holder 6. Preferably, and as shown, the holding section 11 and the membrane holder 6 are shaped so as to provide for a snap-fit of the membrane holder within holding section 11. This allows upon production of the one-way valve to introduce the membrane with its holder 6 by a press-fit step into the adapter to provide the fully functional one-way valve which then can be press-fitted into the container neck as mentioned above.

The adapter 10 further comprises an inner structure providing for a column 20 that extends up to the membrane closure head 8. This column 20 preferably is centered within the adapter 10 as shown and it is preferred that the column is in one piece with the other elements of the adapter 10, as shown. The column may be connected to the annular parts of the adapter at the bottom thereof as shown or may be connected thereto further upwards, so that the column would be shorter than shown in the example of the Figures. There will be at least one flow space allowing for the liquid flow from container storage room 31 to the closure head 8 passing column 20. In the shown example there are four ribs 23 that connect column 20 with the inner structure 25 and in particular with wall 25 of the adapter which forms four passages 15 for the liquid to enter the adapter 10 and thus to enter the one-way valve 1. In the preferred embodiment flow passages 15 are arranged in the column 20 as well in the form of grooves. In this case there are four such flow passages 15 which at the same time are aligned with ribs 23. There may be more or less than four such flow passages and their number must not be identical to the number of ribs. It may as well be possible to have a column without flow passages provided in the column itself, so that liquid flow occurs around the column only, which then is for example a cylindrical column or a column with a square section.

The column extends up to the closure head 8. In view of mounting tolerances it even may be that the column touches closure head 8, but this is not preferred. It is preferred that the top of the column ends at a slight distance below the underside of the membrane or closure head 8, respectively. With the term "slight distance" it is meant that the value of the distance is about equal than the thickness of the membrane where it forms the closure head. The distance may be in the range of 0.5 to 3 times the thickness of the closure head or may preferably be in the range of 1 to 2 times the thickness of the closure head. The function of the column is to stabilize the closure head 8 or its tongues 9, respectively, when dispensing pressure on the collapsible container is released.

This can be explained in more detail as follows. When dispensing pressure is exerted on the body of the container and in particular on the tube body, pressure within the body rises and the tongues 9 of the one-way valve are bent upwards, opening a passage from storage space into room 26 above the closure head so that liquid can be dispensed out of the container through port 27. This position of the membrane and its tongues is not shown in the drawings but is easily understandable by shown views from above on the elastically deformable tongues. These tongues will bend upward when pressure of the liquid raises and by bending upwardly a through passage for the liquid is formed. It is as well clear that the amount of bending will be greater the greater the liquid pressure but of course within the limits of the geometry and the elasticity of the tongues, which limits bending. The general behavior of a membrane valve is known to the skilled person and needs not to be elaborated further for the purpose of the present invention. When, on the other hand, pressure on the container body is released, liquid pressure on the tongues stops and the tongues 9 will bend downwards to the closed rest state of the closure head 8, on the one hand due to the inherent property of the membrane to regain its given shape. On the other hand the container body itself wants to expand to its original shape due to the characteristics of the plastic material from which the body is made. Air under atmospheric pressure would thus want to fill the storage room allowing the container body to expand. It is the function of the one-way valve to prevent the entrance of air within the storage room 31 under this condition and thus to avoid expanding of the container body. There may be a considerable expanding force of the container and air may be sucked in into the container despite the closure head 8 with tongues 9 closing and abutting to each other. Under such conditions column 20 can form a stop against downward bending of the tongues that may—without the column—be so large that the tongues do not seal enough against each other so that air may leak in. This is avoided by the column which prevents after the initial closing of the closure head 8 that the tongues may be bent too far downwardly. So the column 20 allows for the use of the membrane one-way valve even with rather soft membrane material with good dispensing properties in combination with very large tubes or bottles, respectively, which may tend to produce large forces in order to recover their original shape after dispensing. The good sealing properties against air entering the container due to the membrane downward bending limiting properties of the one-way valve according to the invention thus allows a use of such valves in a broader range of container sizes and container properties.

In the shown example the column is cross shaped in a horizontal sectional view and in the drawings it is shown that the arms of this cross-shape align with the slits of the membrane. This may occur accidentally but the mounting of the membrane holder in the adapter is usually done in such a way that the membrane slits are not aligned on purpose with the shape of the column. The beneficial effect of the column is present nevertheless since the bending stop against downward bending of the tongues within the one-way valve occurs mainly by the center of the column forming a support when needed for the tips of the tongues.

Thus a collapsible container and a one-way valve is provided with the present invention. The valve comprises a cupola shaped slitted membrane forming a closure head to allow dispensing of a liquid contained in the container by opening the membrane under liquid pressure. When pressure is reduced the membrane will close and prevent the entrance of air into the container. To avoid a deformation of the membrane in counter dispensing direction a supporting column is arranged within the valve ending in a distance from the lower side of the membrane. This column will prevent an opening of the membrane closure head towards the container storage room when air pressure in direction into the container is too high to be borne by the membrane closure head alone.

While there are shown and described presently preferred embodiments of the invention, it is to be distinctly understood that the invention is not limited thereto but may be otherwise variously embodied and practiced within the scope of the following claims.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A one-way valve adapted for controlling liquid flow out of a collapsible container upon compression of said container and for blocking the entrance of air into the container when dispensing pressure on the container is relieved, wherein the one-way valve comprises an annular closure membrane holder, a closure membrane mounted within said closure membrane holder and extending therein in a generally convex shape as seen in dispensing liquid flow direction and having a closure head with several closure tongues being arranged to contact each other and to form a closed cupola shaped head at rest and to elastically deform and to partly separate from each other to provide a dispensing opening under liquid pressure, and further comprising an adapter having an upper annular part adapted for taking up and securing said closure membrane holder and having a lower part including a column extending into the upper annular part and towards the closure head, said adapter providing at least one flow channel extending from its lower part to its upper part and said adapter being shaped on its outside to sealingly fitting the inside of the container, and wherein the column is centered within the adapter and extends up towards the membrane closure head.

2. The one-way valve according to claim 1 wherein the adapter comprises an annular shaped lower outer wall structure, an annular shaped lower inner wall structure and an annular recess separating the outer and inner wall structures.

3. The one-way valve according to claim 1, wherein the column forms part of the at least one flow channel.

4. The one-way valve according to claim 3, wherein at least two flow channels are provided by said column.

5. The one-way valve according to claim 1 wherein the distance between the top of the column and the inside of the closure head is 0.5 to 3 times the thickness of the closure head.

6. A collapsible container provided with a one-way valve adapted for controlling liquid flow out of the collapsible container upon compression of said container and for blocking the entrance of air into the container when dispensing pressure on the container is relieved, wherein the one-way valve of the container comprises an annular closure membrane holder, a closure membrane mounted within said closure membrane holder and extending therein in a generally convex shape as seen in dispensing liquid flow direction and having a closure head with several closure tongues being arranged to contact each other and to form a closed cupola shaped head at rest and to elastically deform and to partly separate from each other to provide a dispensing opening under liquid pressure, and further comprising an adapter having an upper annular part adapted for taking up and securing said closure membrane holder and having a lower part including a column extending into the upper annular part and towards the closure head, said adapter providing at least one flow channel extending from its lower part to its upper part and said adapter being sealingly fitted to the inside of the container, and wherein the column is centered within the adapter and extends up towards the membrane closure head.

7. The collapsible container according to claim 6 wherein the adapter comprises an annular shaped lower outer wall structure, an annular shaped lower inner wall structure and an annular recess separating the outer and inner wall structures.

8. The collapsible container according to claim 6, wherein the column forms part of the at least one flow channel.

9. The collapsible container according to claim 8, wherein at least two flow channels are provided by said column.

10. The collapsible container according to claim 6 wherein the distance between the top of the column and the inside of the closure head is 0.5 to 3 times the thickness of the closure head.

11. The collapsible container according to claim 6 comprising a body part, a head part with a neck and a shoulder wherein the one-way valve is fitted by a press-fit within the neck.

12. The collapsible container according to claim 6 wherein the container is a tube.

13. The one-way valve according to claim 3, wherein four flow channels are provided by said column.

14. The collapsible container according to claim 8, wherein four flow channels are provided by said column.

* * * * *